(12) United States Patent
Esaki

(10) Patent No.: US 12,541,982 B2
(45) Date of Patent: Feb. 3, 2026

(54) LINE OF SIGHT ESTIMATING DEVICE, STORAGE MEDIUM FOR STORING COMPUTER PROGRAM FOR LINE OF SIGHT ESTIMATION, AND LINE OF SIGHT ESTIMATING METHOD

(71) Applicants: TOYOTA JIDOSHA KABUSHIKI KAISHA, Toyota (JP); AISIN CORPORATION, Aichi-ken (JP)

(72) Inventor: Hirotsugu Esaki, Tokyo-to (JP)

(73) Assignees: TOYOTA JIDOSHA KABUSHIKI KAISHA, Toyota (JP); AISIN CORPORATION, Aichi-ken (JP)

( * ) Notice: Subject to any disclaimer, the term of this patent is extended or adjusted under 35 U.S.C. 154(b) by 354 days.

(21) Appl. No.: 18/324,211

(22) Filed: May 26, 2023

(65) Prior Publication Data

US 2024/0029454 A1 Jan. 25, 2024

(30) Foreign Application Priority Data

Jul. 25, 2022 (JP) .................................. 2022-117890

(51) Int. Cl.
*G06V 20/59* (2022.01)
*G06T 7/73* (2017.01)
(Continued)

(52) U.S. Cl.
CPC .............. *G06V 20/597* (2022.01); *G06T 7/73* (2017.01); *G06V 20/58* (2022.01); *G06V 40/171* (2022.01);
(Continued)

(58) Field of Classification Search
CPC .... G06V 20/597; G06V 20/58; G06V 40/171; G06V 40/193; G06V 20/52;
(Continued)

(56) References Cited

U.S. PATENT DOCUMENTS

2011/0249868 A1* 10/2011 Tsukizawa ............. A61B 5/163
382/103
2015/0154461 A1* 6/2015 Kitaura ................ G06V 20/597
348/148
(Continued)

FOREIGN PATENT DOCUMENTS

JP 2016073357 A 5/2016
JP 2018180623 A * 11/2018
(Continued)

*Primary Examiner* — Stephen R Koziol
*Assistant Examiner* — Ashley Hytrek
(74) *Attorney, Agent, or Firm* — Dickinson Wright, PLLC

(57) ABSTRACT

The line of sight estimating device has a processor configured to estimate a line of sight direction of a driver using the facial feature points and determine reliability of the line of sight direction based on the reliability of the facial feature points, determine whether or not the driver is in a gazing state based on the line of sight direction and multiple other line of sight directions, when the reliability of the line of sight direction is below a threshold, detect a gazed object estimated to be gazed at by the driver appearing in a front image based on the line of sight direction, when the driver is in the gazing state, and correct the line of sight direction so as to be oriented toward the gazed object, when the reliability of the line of sight direction is below the threshold and the driver is in the gazing state.

6 Claims, 6 Drawing Sheets

(51) Int. Cl.
  *G06V 20/58* (2022.01)
  *G06V 40/16* (2022.01)
(52) U.S. Cl.
  CPC .............. *G06T 2207/30201* (2013.01); *G06T 2207/30252* (2013.01); *G06T 2207/30268* (2013.01)
(58) Field of Classification Search
  CPC .... G06V 40/161; G06V 40/168; G06V 40/18; G06T 7/73; G06T 2207/30201; G06T 2207/20081; G06T 2207/20084
  See application file for complete search history.

(56) References Cited

U.S. PATENT DOCUMENTS

| | | | | |
|---|---|---|---|---|
| 2016/0042240 | A1* | 2/2016 | Takeda | G06T 7/73 382/104 |
| 2016/0095511 | A1* | 4/2016 | Taguchi | G06F 3/013 351/209 |
| 2020/0105016 | A1 | 4/2020 | Yamada et al. | |

FOREIGN PATENT DOCUMENTS

| | | | |
|---|---|---|---|
| JP | 2019101520 A | * | 6/2019 |
| JP | 2020048971 A | | 4/2020 |
| WO | 2015064080 A1 | | 5/2015 |

\* cited by examiner

LINE OF SIGHT ESTIMATING DEVICE, STORAGE MEDIUM FOR STORING COMPUTER PROGRAM FOR LINE OF SIGHT ESTIMATION, AND LINE OF SIGHT ESTIMATING METHOD

FIELD

The present disclosure relates to a line of sight estimating device, a storage medium for storing a computer program for line of sight estimation, and a line of sight estimating method.

BACKGROUND

The prior art has examples of estimating the direction of the line of sight of a driver who is driving a vehicle. The line of sight direction of the driver is used to monitor the state of the driver.

Facial feature points such as eye corners, inner eyes and pupil centers are detected from an image captured of the driver's face, and the line of sight direction of the driver is estimated based on the facial feature points. The driver's face is captured using a monitoring camera installed in the steering column, for example. When the driver's face is facing forward toward the front of the vehicle, a monitoring camera is used to capture the driver's face from the front, thus precisely detecting facial feature points based on the captured image.

For example, a line of sight direction estimating device has been proposed that estimates the line of sight direction of the driver based on the facial image of the driver who is driving the vehicle and determines whether the driver is looking in the forward direction, estimating a reference direction based on the estimated line of sight in the period during which it has been determined that the driver is looking in the forward direction, and correcting for the line of sight based on the reference direction (see Japanese Unexamined Patent Publication No. 2018-180623). With this line of sight direction estimating device, the line of sight is corrected based on the estimated reference direction when it has been determined that the vehicle is moving straight ahead.

SUMMARY

A driver will sometimes direct the face to the right or left direction while driving the vehicle, to confirm the conditions around the vehicle. In such cases, a monitor camera captures the face of the driver in from a slanted direction as seen from the front.

When the driver's face is facing the right or left direction with respect to the front of the vehicle, the driver's face is captured at an angle by the monitoring camera, making it impossible to precisely detect facial feature points based on the captured image. When the locations of facial feature points are wrong it can also potentially prevent precise estimation of the line of sight direction of the driver as well.

It is an object of the present disclosure to provide a line of sight estimating device that can precisely estimate the line of sight direction of a driver based on a captured image of the driver's face, even when the driver's face is directed toward the right or left direction with respect to the front of the vehicle.

One embodiment of the invention provides a line of sight estimating device. The line of sight estimating device has a feature point detector that detects facial feature points in a facial image that includes a driver's face and determines reliability of the detected facial feature points; a first line of sight estimating unit that estimates a first line of sight direction of the driver using the facial feature points, and determines reliability of the first line of sight direction based on the reliability of the facial feature points, a determining unit that determines whether or not the driver is in a gazing state based on the first line of sight direction and multiple other line of sight directions of the driver within a predetermined period prior to a time at which the first line of sight direction was estimated, when the reliability of the first line of sight direction is below a predetermined threshold, an object detector that detects a gazed object estimated to be gazed at by the driver from among objects appearing in a front image representing environment in front of the driver based on the first line of sight direction, when the driver is in the gazing state, and a correcting unit that corrects the first line of sight direction so as to be oriented toward the gazed object when the reliability of the first line of sight direction is below the predetermined threshold and the driver is in the gazing state.

In this line of sight estimating device, it is preferable that the line of sight estimating device further have a face orientation estimating unit that uses the facial feature points to estimate the direction of facial orientation in which the driver's face is oriented, and a second line of sight estimating unit that estimates a second line of sight direction of the driver based on the locations of the facial feature points and the location of the gazed object within the front image, in which when the reliability of the first line of sight direction is below the predetermined threshold and the driver is in a gazing state, the correcting unit calculates degree of correction based on a product of an angle formed between the direction of facial orientation and the second line of sight direction, and an inverse of the reliability of the first line of sight direction, and moves the first line of sight direction in a direction from the second line of sight direction toward the direction of facial orientation by an angle represented by the degree of correction, to correct the first line of sight direction.

In this line of sight estimating device, it is preferable that the first line of sight estimating unit estimate a location between eyebrows of the driver based on a location of the facial feature point representing a left eye of the driver and a location of the facial feature point representing a right eye of the driver, and estimate the second line of sight direction to be a direction from the location between the eyebrows toward the gazed object.

Also in this line of sight estimating device, it is preferable that the determining unit determine that the driver is in the gazing state when dispersion in the first line of sight direction and the multiple other line of sight directions is within a predetermined reference value.

According to another embodiment, a non-transitory storage medium storing a computer program for line of sight estimation is provided. The computer program for line of sight estimation causes a processor execute a process and the process includes detecting facial feature points in a facial image that includes a driver's face and determining reliability of the detected facial feature points, estimating a first line of sight direction of the driver using the facial feature points, and determining reliability of the first line of sight direction based on the reliability of the facial feature points, determining whether or not the driver is in a gazing state based on the first line of sight direction and multiple other line of sight directions of the driver within a predetermined period prior to a time at which the first line of sight direction was estimated, when the reliability of the first line of sight direction is below a predetermined threshold, detecting a gazed object estimated to be gazed at by the driver from among objects appearing in a front image representing environment in front of the driver based on the first line of sight direction, when the driver is in the gazing state, and correcting the first line of sight direction so as to be oriented toward the gazed object when the reliability of the first line of sight direction is below the predetermined threshold and the driver is in the gazing state.

According to yet another embodiment of the invention there is provided a line of sight estimating method. The line of sight estimating method is carried out by a line of sight estimating device and includes detecting facial feature points in a facial image that includes a driver's face and determining reliability of the detected facial feature points, estimating a first line of sight direction of the driver using the facial feature points, and determining reliability of the first line of sight direction based on the reliability of the facial feature points, determining whether or not the driver is in a gazing state based on the first line of sight direction and multiple other line of sight directions of the driver within a predetermined period prior to a time at which the first line of sight direction was estimated, when the reliability of the first line of sight direction is below a predetermined threshold, detecting a gazed object estimated to be gazed at by the driver from among objects appearing in a front image representing environment in front of the driver based on the first line of sight direction, when the driver is in the gazing state, and correcting the first line of sight direction so as to be oriented toward the gazed object when the reliability of the first line of sight direction is below the predetermined threshold and the driver is in the gazing state.

The line of sight estimating device of the present disclosure can precisely estimate the line of sight of a driver based on a captured image of the driver's face, even when the driver's face is directed toward the right or left direction with respect to the front of the vehicle.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1A:
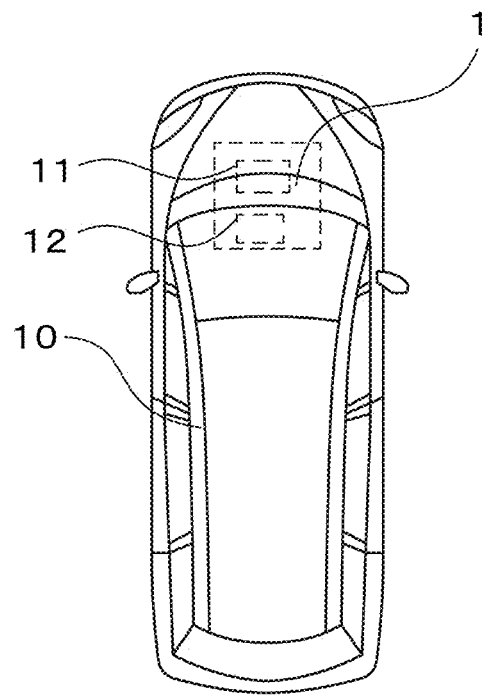
FIG. 1A is a diagram illustrating in overview the operation of a monitoring system having the line of sight estimating device of the embodiment, and showing a vehicle.
Figure 1B:
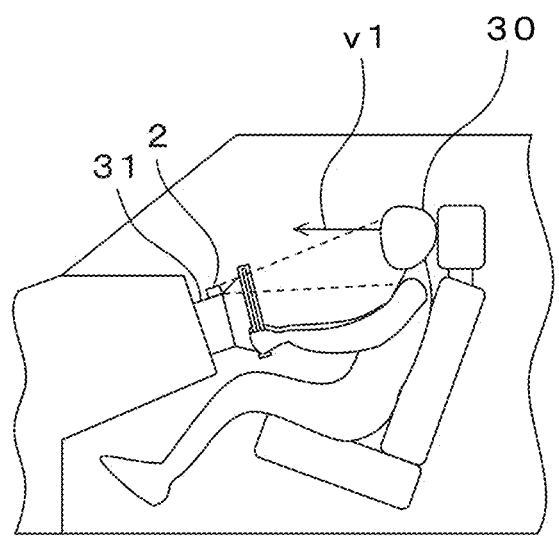
FIG. 1B is a diagram illustrating in overview the operation of a monitoring system having the line of sight estimating device of the embodiment, where a monitoring camera is taking a facial image that includes the face of the driver.
Figure 1C:
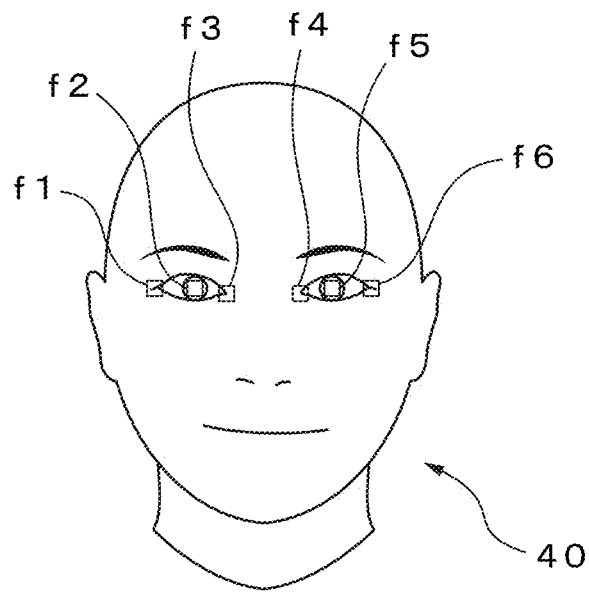
FIG. 1C is a diagram illustrating in overview the operation of a monitoring system having the line of sight estimating device of the embodiment, and showing a facial image where the driver is facing forward.
Figure 1D:
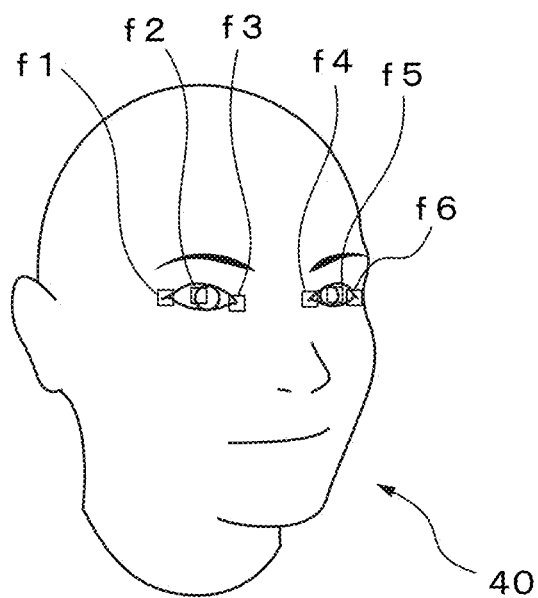
FIG. 1D is a diagram illustrating in overview the operation of a monitoring system having the line of sight estimating device of the embodiment, and showing a facial image where the driver is facing toward the left.

FIG. 1A to FIG. 1D are diagrams illustrating in overview the operation of a monitoring system comprising the line of sight estimating device 11 of the embodiment. FIG. 1A shows a vehicle, FIG. 1B shows a facial image including the face of the driver being captured by a monitoring camera, FIG. 1C shows a facial image of the driver facing forward, and FIG. 1D shows a facial image of the driver facing toward the left.

As shown in FIG. 1A, the vehicle 10 includes a monitoring system 1, the monitoring system 1 being configured to comprise a line of sight estimating device 11 that estimates the line of sight direction v1, and a monitoring device 12 that monitors the state of the driver 30 in regard to driving, based on the first line of sight direction v1 estimated by the line of sight estimating device 11.

As shown in FIG. 1B, the line of sight estimating device 11 uses a monitoring camera 2 disposed on the steering column 31 in the compartment, to capture a facial image including the face of the driver 30 who is driving the vehicle 10, and estimates the first line of sight direction v1 based on the facial image.

When the vehicle 10 is moving forward, the face of the driver 30 may be facing forward toward the front of the vehicle. As shown in FIG. 1C, when the face of the driver 30 is facing forward toward the front of the vehicle, facial feature points such as the left and right eye corners f1, f6, inner eyes f3, f4 and pupil centers f2, f5, are precisely detected based on the captured facial image 40. The reliability of the line of sight direction v1 as estimated based on these facial feature points is therefore considered to be high. When the reliability of the first line of sight direction v1 is higher than a predetermined reliability threshold, the monitoring device 12 monitors the state of the driver in regard to driving based on the first line of sight direction v1.

When the vehicle 10 makes a left turn, the face of the driver 30 may be directed toward the left with respect to the front of the vehicle, so that the driver 30 can confirm the condition in the left turning direction. When the face of the driver 30 is facing the left direction with respect to the front of the vehicle, as shown in FIG. 1D, it may not be possible to precisely detect facial feature points based on the captured facial image. The precision of the line of sight direction as estimated based on the facial feature points may not be very high as a result.

At the line of sight estimating device 11, when the reliability of the estimated line of sight direction is low, it is determined whether or not the driver 30 is in a gazing state based on the first line of sight direction v1 and the multiple other line of sight directions of the driver 30 within a predetermined period. When the driver 30 is in a gazing state, the line of sight estimating device 11 subsequently detects the gazed object estimated to be gazed at by the driver 30. The line of sight estimating device 11 then uses the gazed object to correct the first line of sight direction v1, and outputs the corrected first line of sight direction v4 (described below) as an estimated value. The monitoring device 12 monitors the state of the driver in regard to driving, based on the corrected first line of sight direction v4.

The monitoring system 1 can thus precisely estimate the line of sight of a driver based on a captured image of the driver's face, even when the driver's face is directed toward the right or left direction with respect to the front of the vehicle, and can therefore accurately monitor the state of the driver.

Figure 2:
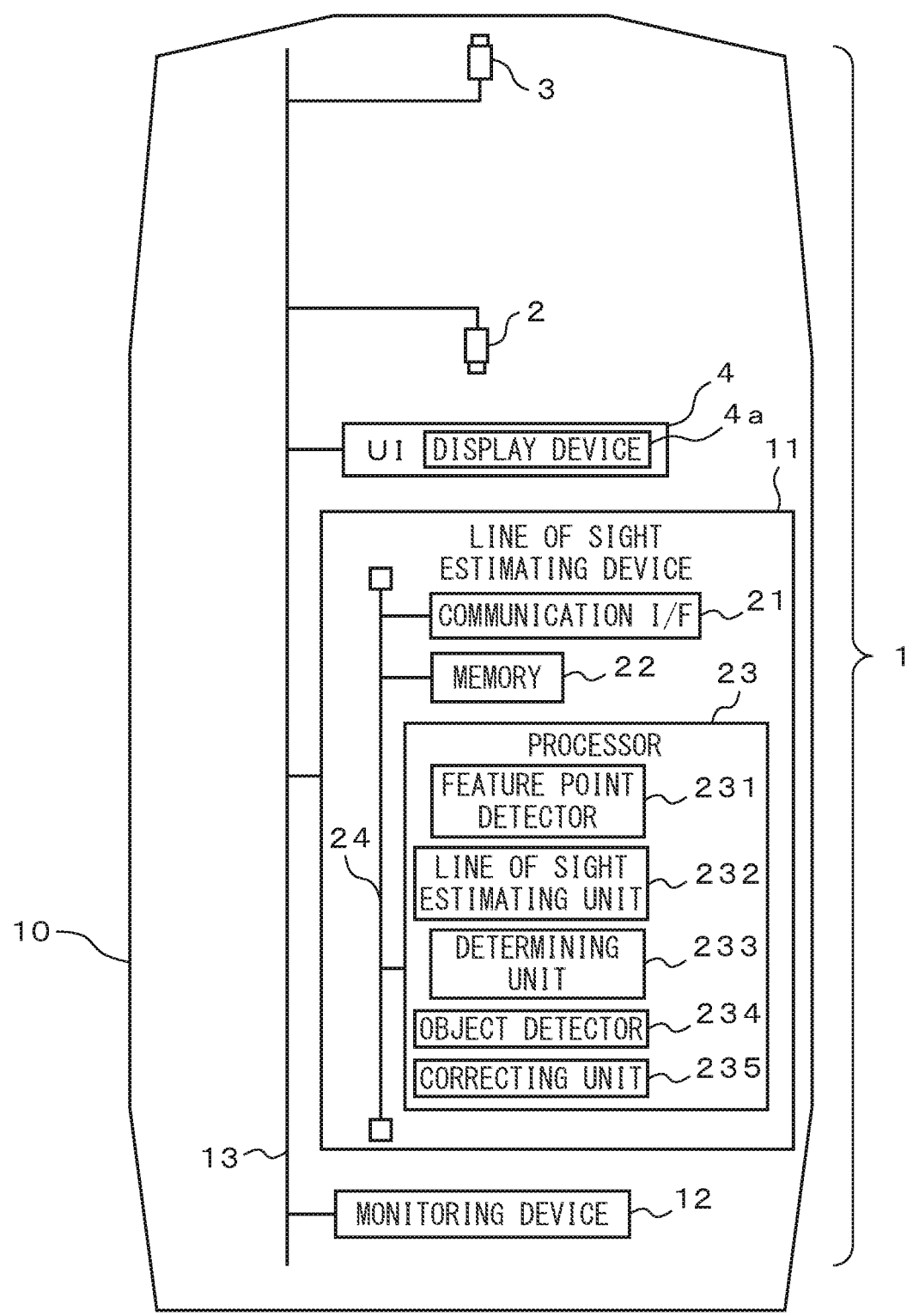
FIG. 2 is a general schematic drawing of a vehicle in which the line of sight estimating device of the embodiment is mounted.

FIG. 2 is a general schematic drawing of a vehicle 10 in which the line of sight estimating device 11 of the embodiment is mounted. The monitoring system 1 has a monitoring camera 2, a front camera 3, a user interface (UI) 4, a line of sight estimating device 11 and a monitoring device 12.

The monitoring camera 2, front camera 3, UI 4, line of sight estimating device 11 and monitoring device 12 are connected in a communicable manner via an in-vehicle network 13 conforming to the Controller Area Network standard.

The monitoring camera 2 is disposed in the compartment in a manner allowing it to capture facial images including the face of the driver driving the vehicle 10. The monitoring camera 2 is, specifically, an example of a capturing device that takes facial images including the face of the driver. The monitoring camera 2 is disposed on the steering column 31, for example, as shown in FIG. 1B. The monitoring camera 2 may also be disposed on the steering wheel, room mirror, meter panel or meter hood in the compartment.

The monitoring camera 2 captures facial images including the face of the driver, at a predetermined cycle, for example. The monitoring camera 2 has a 2D detector composed of an array of photoelectric conversion elements with infrared sensitivity, such as a CCD or C-MOS, and an imaging optical system that forms an image of the captured region on the 2D detector. The predetermined cycle may be 0.1 to 0.5 second, for example. The monitoring camera 2 preferably has a lighting device in addition to the 2D detector. The lighting device is an LED (light emitting diode), and for example, it may consist of two near-infrared LEDs situated on either side of the imaging optical system. Illuminating the driver with near-infrared light allows the driver's face to be captured without causing discomfort for the driver even during low-illuminance periods such as nighttime. A bandpass filter that removes light of wavelength components other than near-infrared is built into the imaging optical system, and a visible light cut filter that removes light other than near-infrared light irradiated from a near-infrared LED may also be provided at the front of the lighting device.

The front camera 3 is mounted inside the compartment of the vehicle 10 and directed toward the front of the vehicle 10. The front camera 3 is an example of a capturing device that captures front images representing the environment in front of the driver. The front camera 3 captures front images in which a predetermined region in front of the vehicle 10 and driver is represented, at a front imaging time that is the same as the facial imaging time, with the same cycle as the monitoring camera 2. The front image shows pedestrians around the vehicle 10, other vehicles, or road features such as crosswalks on the road surface in the predetermined region in front of the vehicle 10. The front camera 3 has a 2D detector composed of an array of photoelectric conversion elements with visible light sensitivity, such as a CCD or C-MOS, and an imaging optical system that forms an image of the captured region on the 2D detector. The front camera 3 preferably has a wide visual field to include the field of view of the driver. For example, the front camera 3 preferably has a visual field of close to 180°.

The UI 4 is an example of the notification unit. The UI 4 is controlled by the monitoring device 12 to give the driver a warning as an attention request to direct attention to the environment around the vehicle. The UI 4 has a display device 4a such as a liquid crystal display or touch panel, for display of information such as attention requests. The UI 4 may also have an acoustic output device (not shown) to notify the driver of attention requests. The UI 4 also has a touch panel or operating button, for example, as an input device for inputting operation information from the driver to the vehicle 10. Operation information may include information indicating approval of an attention request, for example. The UI 4 outputs the input operation information to the monitoring device 12 via the in-vehicle network 13.

The line of sight estimating device 11 estimates the line of sight of the driver based on the facial images, and outputs the estimated line of sight direction to the monitoring device 12. The line of sight estimating device 11 has a communication interface (IF) 21, a memory 22 and a processor 23. The communication interface 21, memory 22 and processor 23 are connected via signal wires 24. The communication interface 21 has an interface circuit to connect the line of sight estimating device 11 with the in-vehicle network 13.

The memory 22 is an example of a memory unit, and it has a volatile semiconductor memory and a non-volatile semiconductor memory, for example. The memory 22 stores an application computer program and various data to be used for information processing carried out by the processor 23 of each device. The memory 22 also stores facial images input from the monitoring camera 2, in association with the facial imaging times. The memory 22 further stores front images input from the front camera 3, in association with the front imaging times.

All or some of the functions of the line of sight estimating device 11 are functional modules driven by a computer program operating on the processor 23, for example. The processor 23 has a feature point detector 231, a line of sight estimating unit 232, a determining unit 233, an object detector 234 and a correcting unit 235. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. Operation of the line of sight estimating device 11 will be described in detail below.

Based on front images and the line of sight of the driver, the monitoring device 12 detects objects estimated to be gazed at by the driver from among objects appearing in the front images. The monitoring device 12 determines whether or not the driver is gazing at a given object while the vehicle 10 is traveling through an intersection. When the driver is not gazing at a given object, the monitoring device 12 determines that the degree of contribution of the driver to driving is low. For example, when the vehicle 10 is to make a left turn or right turn at an intersection, the monitoring device 12 determines that the contribution of the driver to driving is low if a pedestrian is crossing the crosswalk but the driver 30 is not gazing at the pedestrian. For example, when the vehicle 10 is traveling through the intersection, the monitoring device 12 determines that the contribution of the driver to driving is low if there is a traffic light but the driver is not gazing at the traffic light. When the contribution of the driver to driving is determined to be low, the monitoring device 12 notifies the driver via the UI 4 of a request to give attention to the environment surrounding the vehicle.

For FIG. 2, the line of sight estimating device 11 was described as a separate device from the monitoring device 12, but all or some of the devices may also be constructed as a single device. The line of sight estimating device 11 and monitoring device 12 are electronic control units (ECU), for example.

Figure 3:
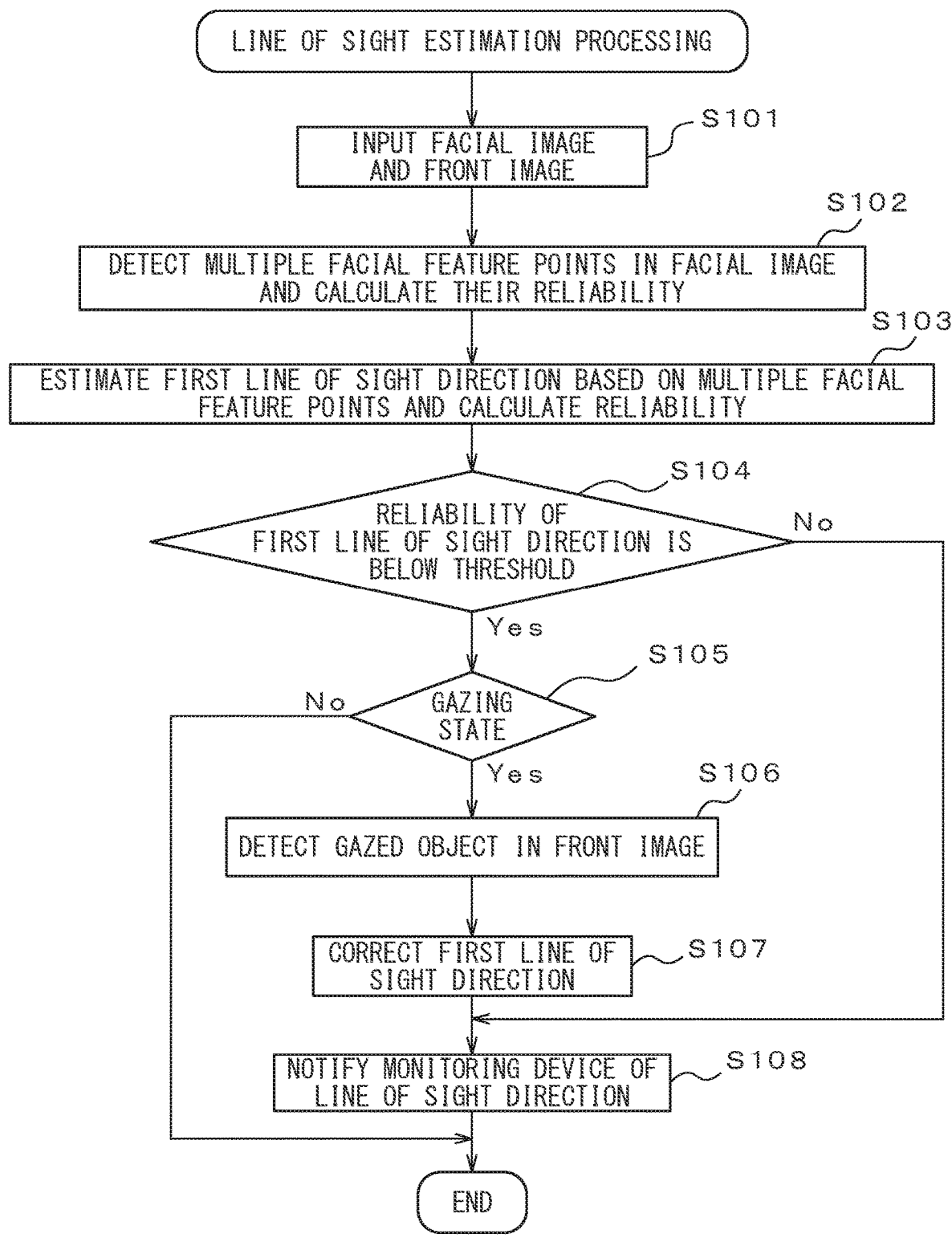
FIG. 3 is an example of an operation flow chart for line of sight estimation processing with the line of sight estimating device of the embodiment.

FIG. 3 is an example of an operation flow chart for line of sight estimation processing with the line of sight estimating device 11 of the embodiment. Line of sight estimation processing by the monitoring system 1 will be described below with reference to FIG. 3. The line of sight estimating device 11 carries out line of sight estimation processing according to the operation flow chart shown in FIG. 3, each time a facial image is input from the monitoring camera 2.

First, the feature point detector 231 inputs a facial image and front image from the monitoring camera 2 through the in-vehicle network 13 (step S101). Each time a facial image is captured, the monitoring camera 2 outputs the facial image and the facial imaging time at which the facial image was captured, to the line of sight estimating device 11 via the in-vehicle network 13. The feature point detector 231 stores the facial image in the memory 22 in association with the facial imaging time.

The feature point detector 231 also inputs a front image and front imaging time from the front camera 3 through the in-vehicle network 13. Each time a front image is captured, the front camera 3 outputs the front image and the front imaging time at which the front image was captured, to the line of sight estimating device 11 and monitoring device 12 via the in-vehicle network 13. The feature point detector 231 stores the front image in the memory 22 in association with the front imaging time.

The feature point detector 231 then detects facial feature points in the facial image and calculates the reliability of the detected facial feature points (step S102). The feature point detector 231 has a configuration including a classifier that has been trained to detect certain sites such as eye corners, inner eyes and pupil centers as facial feature points, by input of facial images. The classifier inputs a facial image and detects the types and locations of facial feature points in each facial image while outputting the reliability of the detected facial feature points. The reliability is represented as a numerical value from 0.0 to 1.0, for example. When the reliability during detection of the facial feature points representing the left eye and/or right eye of the driver is lower than a predetermined reference value, the feature point detector 231 extracts the region containing the left eye and/or right eye from the facial image and generates a partial image. The resolution of the extracted region may also be increased if necessary. The feature point detector 231 inputs the partial image into the classifier and detects the types and locations of facial feature points while calculating the reliability of the detected facial feature points.

The classifier is a convolutional neural network (CNN) having multiple layers connected in series from the input end to the output end, for example. Facial images including the facial feature points are previously input into the CNN as teacher data for learning, whereby the CNN functions as an classifier to detect types and locations of facial feature points. The classifier preferably outputs the reliability of the facial feature points so that the reliability for the estimated feature points is a normal distribution centered on the reliability of the actual feature points. A machine learning model such as a support vector machine or random forest may also be used as the classifier.

The locations of the facial feature points are represented using the monitoring camera coordinate system. In the monitoring camera coordinate system, using the center of the imaging surface as the origin, a Za axis is set in the optical axis direction of the monitoring camera 2, an Xa axis is set in a direction perpendicular to the Za axis and parallel to the ground, and a Ya axis is set in the direction perpendicular to the Za axis and Xa axis, the origin being at a height from the ground equal to the installation height of the monitoring camera 2.

The feature point detector 231 converts the locations of the facial feature points represented in the monitoring camera coordinate system to locations represented in the vehicle coordinate system, and notifies the line of sight estimating unit 232 of the locations, together with the feature point detection times (facial imaging time) representing the times at which the facial feature points were detected. The vehicle coordinate system has a Zb axis set in the traveling direction of the vehicle 10, an Xb axis set in the direction perpendicular to the Zb axis and parallel to the ground, and a Yb axis in the vertical direction, with the origin being the center of the rear axle connecting both rear wheels of the vehicle 10. The conversion formula for conversion of the locations of the facial feature points from the monitoring camera coordinate system to the vehicle coordinate system is represented as a combination between a rotation matrix representing rotation within the coordinate system and a translation vector representing translation within the coordinate system.

The line of sight estimating unit 232 then uses the facial feature points to estimate the first line of sight direction v1 of the driver, and calculates the reliability of the first line of sight direction v1 based on the reliability of the facial feature points (step S103). The line of sight estimating unit 232 calculates the eye center locations based on the eye corner and inner eye locations. For example, the line of sight estimating unit 232 sets the eye center locations to be the locations at predetermined distances in predetermined directions from the midpoints of line segments connecting the eye corner locations and inner eye locations (for example, the negative direction on the Zb axis). The line of sight estimating unit 232 estimates the first line of sight direction v1 to be the direction connecting the eye center locations and the pupil center locations. The line of sight estimating unit 232 may estimate the first line of sight direction v1 based on either the right or left eye of the driver, or it may estimate the respective line of sight directions of the left and right eyes and use their average direction as the first line of sight direction v1. The line of sight estimating unit 232 may also estimate the line of sight of the driver based on the locations of the pupil centers as facial feature points, and Purkinje images.

The line of sight estimating unit 232 also calculates the reliability of the first line of sight direction v1 based on the reliability of the multiple facial feature points (eye corners, inner eyes and pupil centers) used to estimate the first line of sight direction v1 of the driver. For example, the line of sight estimating unit 232 determines the reliability of the first line of sight direction v1 to be the average of the reliability values for the multiple facial feature points (eye corners, inner eyes and pupil centers). The line of sight estimating unit 232 may also determine the reliability of the first line of sight direction v1 to be the minimum value among the reliability values for the multiple facial feature points (eye corners, inner eyes and pupil centers). The line of sight estimating unit 232 stores the first line of sight direction v1 and reliability in the memory 22 in association with the first line of sight estimation time (feature point detection time) at which the first line of sight direction was estimated.

The line of sight estimating unit 232 then determines whether or not the reliability of the first line of sight direction v1 is below the reliability threshold (step S104). The reliability threshold may be 0.7 to 0.9, for example. The line of sight estimating unit 232 may determine that the series of processing steps is complete when reliability falls below a predetermined reliability (for example, 0.4). This is because when the reliability of the first line of sight direction v1 is especially low, it may not be possible to obtain a meaningful line of sight direction even if the first line of sight direction v1 is corrected.

When the reliability of the first line of sight direction v1 has been determined to be below the reliability threshold (step S104—Yes), the determining unit 233 determines whether or not the driver is in a gazing state based on the first line of sight direction v1 and the multiple other line of sight directions of the driver 30 within a predetermined period before the time at which the first line of sight direction v1 was estimated (step S105). The predetermined period may be 1 and 2 seconds after the first line of sight estimation time at which the reliability-calculated first line of sight direction v1 was estimated. The determining unit 233 reads out from the memory 22 the lines of sight of the driver estimated within the predetermined period before the time at which the first line of sight direction v1 was estimated, as the multiple other line of sight directions.

The determining unit 233 represents the first line of sight direction v1 and each of the multiple other line of sight directions as line segments having predetermined length r with the starting point at the origin of the vehicle coordinate system, and represents the locations of the end points of the line segments as polar coordinates (r, θ, φ). Here, θ is the angle of a projection component as the line segment projected onto the Xb-Yb plane from the Xb axis, and φ is the angle from the Zb axis to the line segment. The determining unit 233 calculates the dispersion of θ and the dispersion of φ for the line of sight direction including the first line of sight direction v1 and the multiple other line of sight directions, and calculates the sum of the two dispersions (or the average value of the dispersions) as the dispersion for the line of sight direction.

When the dispersion of the line of sight direction is below a predetermined dispersion reference value, the determining unit 233 determines that the driver is in a gazing state when the first line of sight direction v1 was estimated (step S105—Yes).

The determining unit 233 may have an classifier that has been trained to discriminate whether or not the driver is in a gazing state, by input of the polar coordinates (r, θ, φ) representing the locations of the end points of multiple first line of sight directions v1. The classifier inputs polar coordinates (r, θ, φ) representing the locations of end points for multiple first line of sight directions v1, and outputs identification information indicating whether or not the driver is in a gazing state. The determining unit 233 may also determine whether or not the driver is in a gazing state based on identification information.

The line of sight estimating unit 232 may also have a classifier that has been trained to detect the reliability of pupil center locations, by inputting reliability for eye corners and inner eyes as facial feature points used to estimate the reliability of first line of sight directions v1. The classifier inputs reliability for eye corners and inner eyes as facial feature points used to estimate the reliability of the first line of sight direction v1, and outputs the reliability for the pupil center locations. The line of sight estimating unit 232 may also determine whether or not the driver is in a gazing state based on the reliability of the pupil center locations. When the reliability of the pupil center locations is high, it is estimated that the driver is in a gazing state.

When it has been determined that the driver is in a gazing state, the object detector 234 then detects the gazed object estimated to be gazed at by the driver, among objects appearing in the front image representing the environment in front of the driver, based on first line of sight direction v1 (step S106). Details regarding detection processing for gazed objects will be described below.

The correcting unit 235 then corrects the first line of sight direction v1 so as to be oriented toward the gazed object shown in the front image (step S107). Details regarding correction processing for the first line of sight direction v1 will be described below.

The correcting unit 235 then notifies the monitoring device 12 of the corrected first line of sight direction, and the series of processing steps is complete (step S108).

When it has been determined that the reliability of the facial feature points is greater than the reliability threshold (step S104—No), the correcting unit 235 notifies the monitoring device 12 of the first line of sight direction v1, and the series of processing steps is complete (step S108).

When it has been determined that the driver is not in a gazing state (step S105—No), the first line of sight direction v1 cannot be corrected, and therefore the line of sight direction is not estimated and the series of processing steps is complete.

Figure 4:
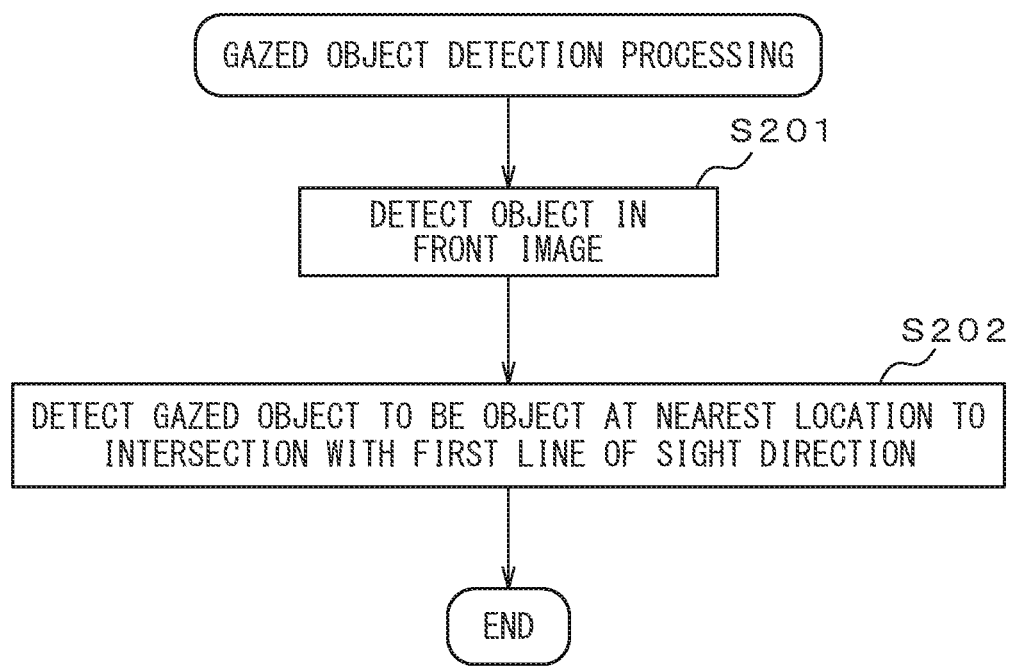
FIG. 4 is an example of an operation flow chart for gazed object detection processing.

FIG. 4 is an example of an operation flow chart for gazed object detection processing in step S106 described above. First, the object detector 234 reads out from the memory 22 the front image that was captured at the front imaging time matching the first line of sight direction estimation time at which the first line of sight direction v1 was estimated. The object detector 234 detects the types and locations of objects represented in the front image (step S201). The object detector 234 has a classifier that has been trained to detect objects represented in images by input of front images. The classifier inputs front images and detects the types and locations of objects represented in the front images. Objects include the road, and persons such as pedestrians, traffic lights and road features such as crosswalks, that may be located around the road.

The classifier is a convolutional neural network (CNN) having multiple layers connected in series from the input end to the output end, for example. Images including persons such as pedestrians, traffic lights, and road features such as crosswalks, are previously input into the CNN as teacher data for learning, whereby the CNN is able to function as a classifier to detect the types and locations of objects. A machine learning model such as a support vector machine or random forest may also be used as the classifier.

Figure 5:
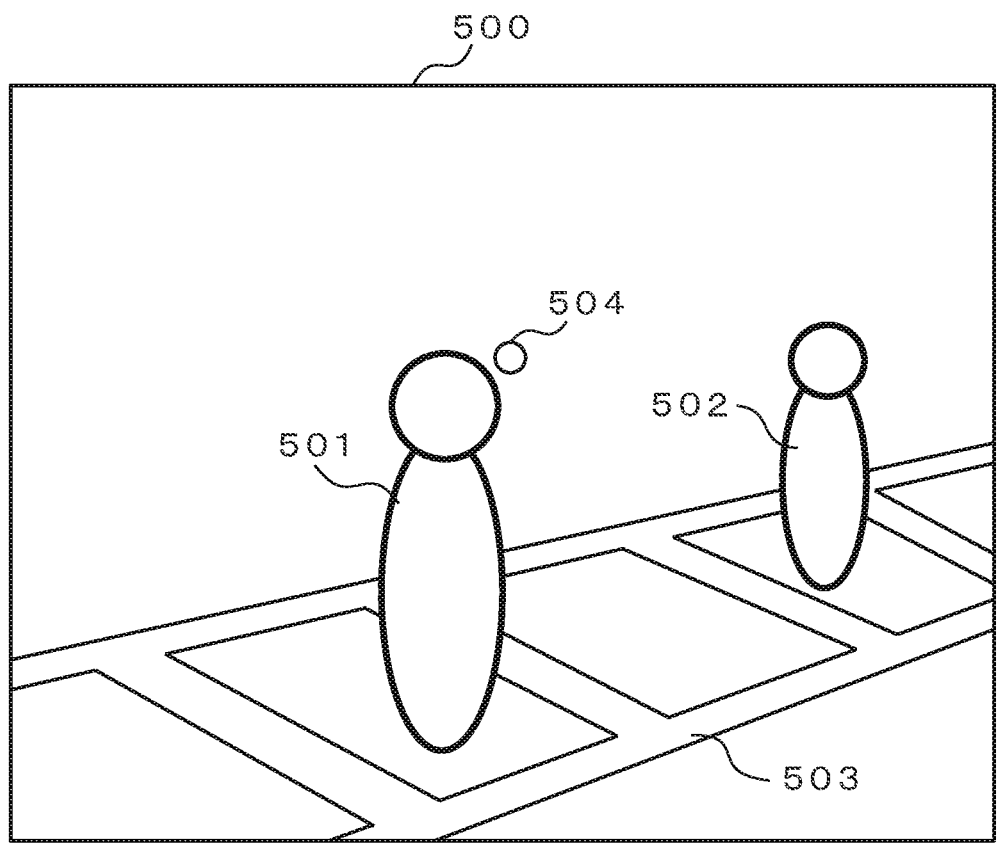
FIG. 5 is a drawing showing an example of a front image.

FIG. 5 is a drawing showing an example of a front image. The front image 500 shows an object region 501 representing a pedestrian and an object region 502 representing another pedestrian, and an object region 503 representing a crosswalk.

The front image is an image of an object projected onto an imaging surface that is perpendicular to the Zc axis of the front camera coordinate system and with its center crossing the Zc axis. The front camera coordinate system uses the center of the imaging surface as the origin, with the Zc axis set in the optical axis direction of the front camera 3, the Xc axis set in a direction perpendicular to the Zc axis and parallel to the ground, and the Yc axis set in the direction perpendicular to the Zc axis and Xc axis, the origin being at a height from the ground equal to the installation height of the front camera 3.

Next, from among the objects appearing in the front image, the object detector 234 detects the gazed object which is located nearest to the intersection between the front image and the first line of sight direction v1 whose reliability was calculated (step S202).

The object detector 234 performs perspective conversion on the front image, converting it to an image with the eye center of the driver as the viewpoint. The perspective conversion of the image may be carried out by a publicly known method.

The object detector 234 situates the origin of the vector having the orientation of the first line of sight direction v1 at the driver's eye center and extends the vector, calculating the distance between the position 504 of the intersection perpendicular to the perspective converted front image, and each of object regions 501 to 503. The distance between the intersection 504 and each object region may be the distance between the intersection 504 and the center of gravity of the object region. The object detector 234 detects the object region 501 of a pedestrian at the nearest location to the intersection 504 as the gazed object, and the series of processing steps is complete. Incidentally, the object detector 234 may also compare changes in the orientation of the first line of sight direction v1 at multiple times, with changes in the locations of the object regions 501, 502, 503, and may detect the gazed object to be the object region exhibiting locational change that most resembles the change in the orientation of the first line of sight direction v1.

The object detector 234 may also output the types and locations of the objects represented in the front image to the monitoring device 12. The monitoring device 12 may also detect an object estimated to be gazed at by the driver from among objects shown in the front image, based on the line of sight of the driver and the types and locations of observation represented in the front image that has been input from the object detector 234, and may determine the contribution of the driver to driving. The monitoring device 12 may also carry out the same object detection processing as the object detector 234, detecting an object estimated to be gazed at by the driver from among the objects shown in the front image.

Figure 6:
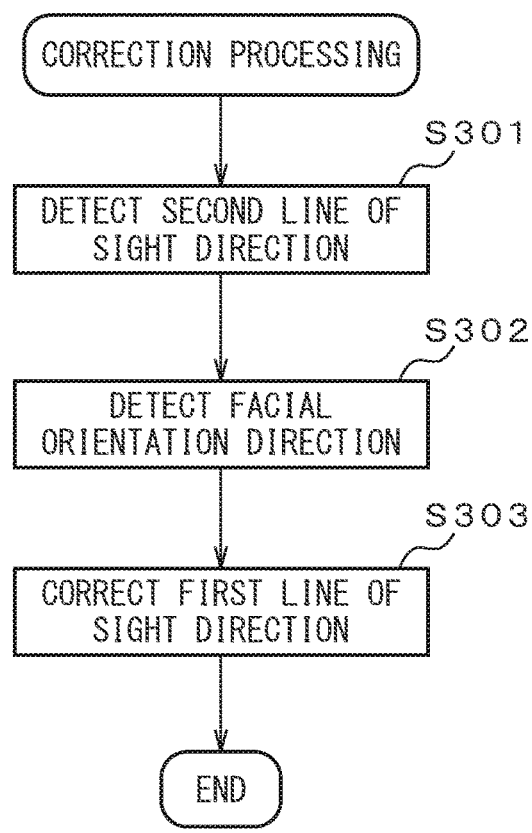
FIG. 6 is an example of an operation flow chart for correction processing.

FIG. 6 is an example of an operation flow chart for correction processing in step S107 described above. First, the line of sight estimating unit 232 estimates the second line of sight direction of the driver based on the location of the gazed object in the front image (step S301).

Figure 7:
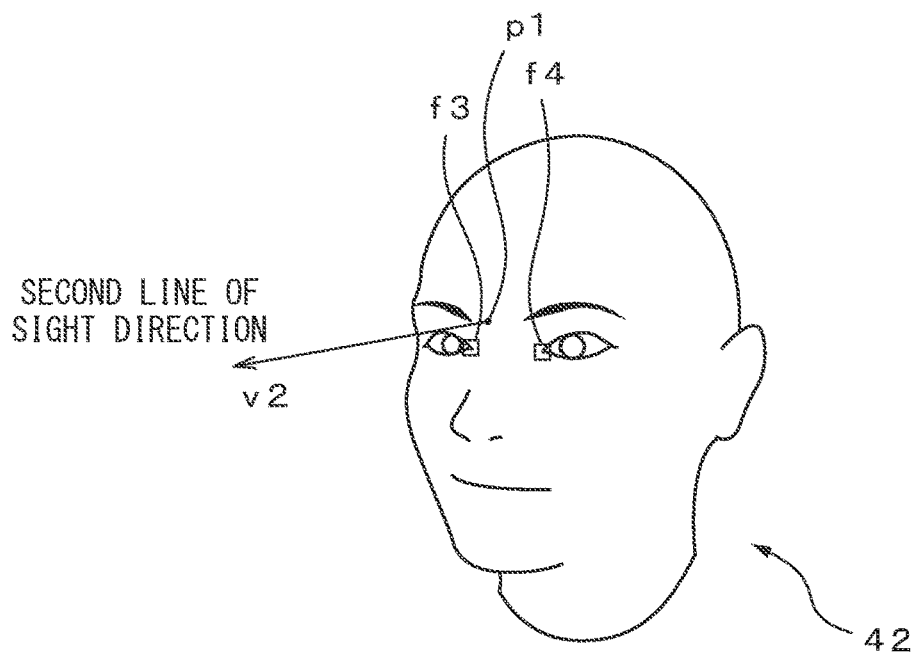
FIG. 7 is a diagram illustrating an example of second line of sight direction detection processing.

FIG. 7 is a diagram illustrating an example of second line of sight direction detection processing. The line of sight estimating unit 232 estimates the location of the region p1 between the eyebrows of the driver, based on the location of the inner eye f3 as a facial feature point representing the left eye of the driver and the location of the inner eye f4 as a facial feature point representing the right eye of the driver, represented in the vehicle coordinate system, for the facial image 42 used in estimating the first line of sight direction v1. For example, the line of sight estimating unit 232 estimates the location at a predetermined distance above the center location of a line connecting the inner eye f3 and inner eye f4 (such as the positive direction on the Yb axis), as the location of the region p1 between the eyebrows.

The object detector 234 performs perspective conversion on the front image, converting it to an image with the location between the eyebrows of the driver p1 of the driver as the viewpoint. The perspective conversion of the image may be carried out by a publicly known method.

The correcting unit 235 estimates the second line of sight direction v2 to be the direction from the location of the region p1 between the eyebrows toward the object region 501 as the gazed object. The line of sight estimating unit 232 estimates the second line of sight direction v2 to be the direction from the location of the region p1 between the eyebrows toward the center of gravity of the object region 501 in the front image 500 shown in FIG. 5.

Figure 8:
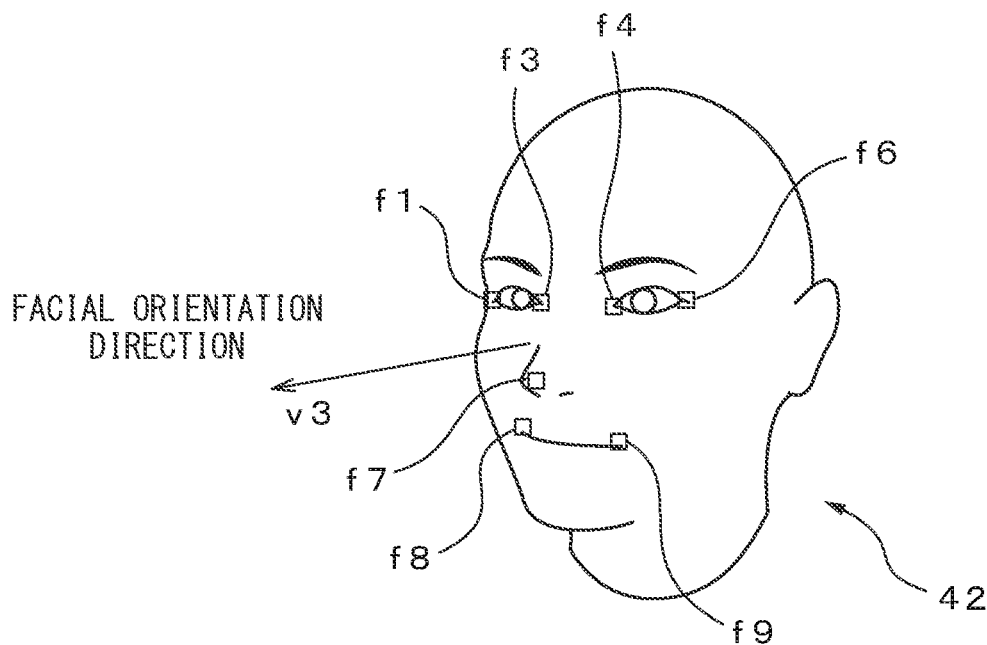
FIG. 8 is a diagram illustrating an example of facial orientation direction detection processing.

The line of sight estimating unit 232 then uses the facial feature points to estimate the direction of facial orientation in which the driver's face is oriented (step S302). The line of sight estimating unit 232 is an example of the face orientation estimating unit. FIG. 8 is a diagram illustrating an example of facial orientation direction estimation processing. The feature point detector 231 inputs the facial image 42 used for estimation of the first line of sight direction v1 into the classifier and detects the locations of the eye corners f1, f6, the inner eyes f3, f4, the nose tip point f7 and the mouth corner points f8 and f9, notifying the line of sight estimating unit 232. The line of sight estimating unit 232 fits the detected facial feature points into a 3D face model representing the three-dimensional shape of the face. The line of sight estimating unit 232 estimates the orientation of the face of the 3D face model where the facial feature points best fit the 3D face model, as the facing direction v3 of the driver's face. The line of sight estimating unit 232 converts the second line of sight direction v2 represented in the monitoring camera coordinate system to the vehicle coordinate system.

The line of sight estimating unit 232 may also estimate the direction of orientation of the driver's face to be the outward direction that is parallel to the ground and perpendicular to a line connecting the locations of the eye corners and the locations of the inner eyes, as feature points of the driver's face, with the origin being the center of that line. The line of sight estimating unit 232 may also estimate the facial orientation direction based on either the right or left eye of the driver, or it may estimate the respective facial orientation directions of the left and right eyes and use their average direction as the facial orientation direction.

Figure 9:
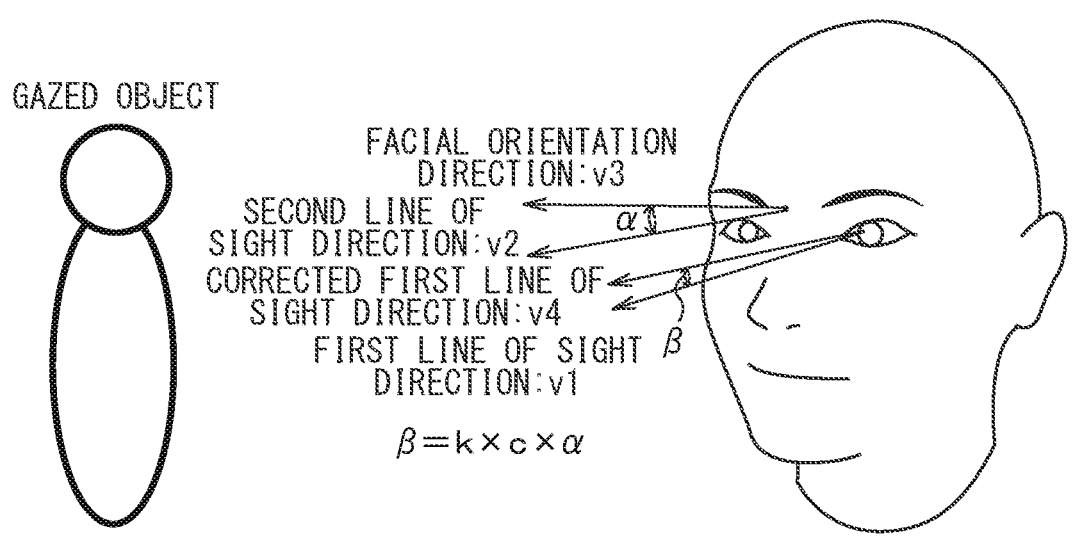
FIG. 9 is a diagram illustrating an example of correction processing.

The correcting unit 235 then corrects the first line of sight direction v1 based on the second line of sight direction v2 and the facial orientation direction v3 (step S303). FIG. 9 is a diagram illustrating an example of correction processing.

First, the correcting unit 235 calculates the angle α formed between the facial orientation direction v3 and the second line of sight direction v2, as shown in FIG. 9. The correcting unit 235 also calculates the degree of correction β, as the product of the coefficient k, the angle α and the inverse c of the reliability of the first line of sight direction v1. The degree of correction β is larger with low reliability of the first line of sight direction v1, and smaller with higher reliability of the first line of sight direction v1. When the reliability is less than a predetermined reference reliability (for example, when the reliability is ≤0.4), the correcting unit 235 may calculate the inverse c of the reliability of the facial feature points using 0.4 as the reliability of the facial feature points. This will prevent divergence of the degree of correction β when the reliability of the first line of sight direction v1 is low.

As shown in FIG. 9, the correcting unit 235 moves the first line of sight direction v1 in the direction from the second line of sight direction v2 toward the facial orientation direction v3, by the angle represented by the degree of correction β, correcting the first line of sight direction v1, and calculates the corrected first line of sight direction v4.

As explained above, the line of sight estimating device can precisely estimate the line of sight of a driver based on a captured image of the driver's face, whether the driver's face is directed toward the front of the vehicle or whether it is directed toward the right or left direction with respect to the front of the vehicle. The monitoring system can therefore precisely monitor the state of the driver based on the line of sight of the driver.

The line of sight estimating device, the computer program for line of sight estimation and the line of sight estimating method according to the embodiments described in the present disclosure may incorporate appropriate modifications that still fall within the gist of the disclosure. Moreover, the technical scope of the disclosure is not limited to these embodiments, and includes the invention and its equivalents as laid out in the claims.

For example, in the embodiments described above the gazed object estimated to be gazed at by the driver was detected from among objects appearing in the front image based on a single first line of sight direction. However, the object detector may also determine the average location among the intersection between the front image and the first line of sight direction and the intersections between the front image and each one of multiple other line of sight directions of the driver within a predetermined period prior to the time at which the first line of sight direction was estimated, and may detect the gazed object to be the object at the location nearest to the average location from among objects appearing in the front image. The object detector may also have a classifier that has been trained to detect gazed objects in images by input of a first line of sight direction and multiple other line of sight directions of the driver within a predetermined period prior to the time at which the first line of sight direction was estimated. The classifier inputs the first line of sight direction and multiple other line of sight directions, and detects gazed objects from the front image. The classifier has a convolutional neural network (CNN) having multiple layers connected in series from the input end to the output end, for example. Images containing line of sight directions and gazed objects are previously input into the CNN as teacher data and used for training, allowing the CNN to operate as a classifier to detect gazed objects.

When the determining unit detects a gazed object in the front image and the first line of sight direction of the driver is outside of the visual field of the front camera, it may be the case that the first line of sight direction of the driver is not fully contained within the front image. The determining unit may therefore use front images captured at different previous times to track movement of the object region shown in the front images, and may estimate the location of the object region shown in the current front image, detecting the gazed object based on the relationship between the estimated object region and the first line of sight direction.

In addition, the vehicle in the embodiment described above had a single front camera capturing the environment ahead of the driver, but the vehicle may instead have multiple front cameras capturing the environment ahead of the driver. The multiple front cameras preferably have different optical axis directions at left and right so that the visual fields partially overlap. The determining unit may use the multiple front images captured by the multiple front cameras to detect a gazed object estimated to be gazed at by the driver. This will allow detection of the gazed object even when the line of sight of the driver is in a direction that cannot be captured by a single front camera.

In addition, when the reliability of the first line of sight direction is below a predetermined threshold and the driver is in a gazing state, the correcting unit may calculate the degree of correction based on the product between the angle formed between the facial orientation direction and the first line of sight direction, and the inverse of the reliability of the first line of sight direction, and may correct the first line of sight direction by moving the first line of sight from the first line of sight direction toward the facial orientation direction by the angle represented by the degree of correction.

The correcting unit may also calculate the degree of correction using a classifier trained to output a degree of correction by input of a facial image, a first line of sight direction and a second line of sight direction.

The invention claimed is:

1. A line of sight estimating device comprising:
   a processor configured to
   detect facial feature points in a facial image that includes a driver's face and determine a confidence score of the detected facial feature points, wherein the facial feature points comprise left and right eye corners, left and right inner eyes, and left and right pupil centers,
   estimate a first line of sight direction of the driver using the facial feature points, and determine a confidence score of the first line of sight direction based on the confidence score of the facial feature points,
   determine whether or not the driver is in a gazing state based on the first line of sight direction and multiple other line of sight directions of the driver within a predetermined period prior to a time at which the first line of sight direction was estimated, when the confidence score of the first line of sight direction is below a first predetermined threshold,
   detect a gazed object estimated to be gazed at by the driver from among objects appearing in a front image representing environment in front of the driver based on the first line of sight direction, when the driver is in the gazing state, and
   correct the first line of sight direction so as to be oriented toward the gazed object when the confidence score of the first line of sight direction is below the predetermined threshold and the driver is in the gazing state.

2. The line of sight estimating device according to claim 1, wherein the processor is further configured to
   use the facial feature points to estimate the direction of facial orientation in which the driver's face is oriented,
   estimate a second line of sight direction of the driver based on the locations of the facial feature points and the location of the gazed object within the front image, and
   when the confidence score of the first line of sight direction is below the predetermined threshold and the driver is in the gazing state, calculate degree of correction based on a product of an angle formed between the direction of facial orientation and the second line of sight direction, and an inverse of the confidence score of the first line of sight direction, and move the first line of sight direction in a direction from the second line of sight direction toward the direction of facial orientation by an angle represented by the degree of correction, to correct the first line of sight direction.

3. The line of sight estimating device according to claim 2, wherein the processor is further configured to estimate a location between eyebrows of the driver based on a location of the facial feature point representing a left eye of the driver and a location of the facial feature point representing a right eye of the driver, and to estimate the second line of sight direction to be a direction from the location between the eyebrows toward the gazed object.

4. The line of sight estimating device according to claim 1, wherein the processor is further configured to determine that the driver is in the gazing state when dispersion in the first line of sight direction and the multiple other line of sight directions is within a predetermined reference value.

5. A computer-readable non-transitory storage medium storing a computer program for line of sight estimation which causes a processor to execute a process, and the process comprising:

detecting facial feature points in a facial image that includes a driver's face and determining confidence score of the detected facial feature points, wherein the facial feature points comprise left and right eye corners, left and right inner eyes, and left and right pupil centers;

estimating a first line of sight direction of the driver using the facial feature points, and determining confidence score of the first line of sight direction based on the confidence score of the facial feature points;

determining whether or not the driver is in a gazing state based on the first line of sight direction and multiple other line of sight directions of the driver within a predetermined period prior to a time at which the first line of sight direction was estimated, when the confidence score of the first line of sight direction is below a first predetermined threshold;

detecting a gazed object estimated to be gazed at by the driver from among objects appearing in a front image representing environment in front of the driver based on the first line of sight direction, when the driver is in the gazing state; and correcting the first line of sight direction so as to be oriented toward the gazed object when the confidence score of the first line of sight direction is below the predetermined threshold and the driver is in the gazing state.

6. A line of sight estimating method carried out by a line of sight estimating device and the method comprising:

detecting facial feature points in a facial image that includes a driver's face and determining confidence score of the detected facial feature points, wherein the facial feature points comprise left and right eye corners, left and right inner eyes, and left and right pupil centers;

estimating a first line of sight direction of the driver using the facial feature points, and determining confidence score of the first line of sight direction based on the confidence score of the facial feature points;

determining whether or not the driver is in a gazing state based on the first line of sight direction and multiple other line of sight directions of the driver within a predetermined period prior to a time at which the first line of sight direction was estimated, when the confidence score of the first line of sight direction is below a first predetermined threshold;

detecting a gazed object estimated to be gazed at by the driver from among objects appearing in a front image representing environment in front of the driver based on the first line of sight direction, when the driver is in the gazing state; and correcting the first line of sight direction so as to be oriented toward the gazed object when the confidence score of the first line of sight direction is below the predetermined threshold and the driver is in the gazing state.

\* \* \* \* \*